Patented Mar. 5, 1935

1,992,935

UNITED STATES PATENT OFFICE 1,992,935

PROCESS OF PRODUCING AMINES

Herrick R. Arnold, Elmhurst, Del., assignor to E. I. du Pont de Nemours & Company, Wilmington, Del., a corporation of Delaware No Drawing. Application August 27, 1930, Serial No. 478,317

15 Claims. (Cl. 260—127)

This invention relates to the art of catalysis, and more particularly to the preparation and use in the catalytic synthesis of amines from alcohols and ammonia of porous, rigid gels impregnated with dehydrating oxides.

It is known that certain oxides, such as those of thorium, tungsten, and silicon, are capable of catalyzing various dehydration reactions, including the reaction by which amines are prepared from alcohols and ammonia. Certain gels, typified by silica gel, have also been proposed as catalytic material for these reactions, but so far as I am aware, the improved results to be obtained by the use in the synthesis of amines of rigid gels impregnated with dehydrating oxides has not thus far been recognized.

This invention has as an object to provide an improved process for the catalytic synthesis of aliphatic and aromatic amines. A further object is to provide such a process involving the use of dehydrating oxides supported on a porous, rigid gel. A specific object is to provide a process for the synthesis of amines involving the use of rigid, porous, refractory silica gel impregnated with aluminum oxide. Further objects will appear hereinafter.

These objects are accomplished by the following invention which, in its general aspects, comprises the preparation of a gel in a rigid condition and free from absorbed or adsorbed gases or liquids, followed by impregnation with a solution of a salt of the dehydrating metal. After filtering, drying, and igniting, the material is used in the catalytic synthesis of amines by passing a mixture of the desired alcohol and ammonia over the catalyst at an elevated temperature. In the synthesis of amines from alcohols and ammonia, it is desirable to use a catalyst which will produce substantial yields of amines with a minimum conversion to undesirable products, such as the unsaturated hydrocarbons. According to the present invention, if a dehydrating oxide, such as alumina, be deposited on the surface of a porous, rigid gel, such as silica gel, and used as a catalyst for the synthesis of amines, substantial yields can be obtained, while the loss due to conversion of alcohol to unsaturated hydrocarbons, aldehydes, or nitriles, is reduced to a practically negligible amount.

In the following examples I have set forth several of the preferred embodiments of my invention, but they are presented only for purposes of illustration and not as a limitation.

Example 1.—A catalyst composed of alumina supported on silica gel was prepared in the following manner: 290 grams of a commercial silica gel was evacuated for four hours at 400° C. After cooling down in vacuo the gel was immersed in a solution of 140 grams of aluminum nitrate in 700 cc. of water. After standing several hours, the excess liquid was filtered off and the impregnated gel was dried and ignited at 400° C. to decompose the aluminum nitrate contained in the pores of the gel.

When used in the catalytic synthesis of butyl amines by passing butanol and ammonia in mol ratios, varying from 1:3 to 1:6 over 50 cc. of the catalyst at 325° C. with a time of contact of gas and vapor of 1.2 seconds, a conversion of the butanol to mono-, di-, and tri-amines of 5.2%, 16.0% and 4.0% respectively was obtained, the total conversion being 25.2%, with a loss to butylene of only 0.9%.

Under similar conditions, an unsupported catalyst consisting of aluminum phosphate, gave a conversion to amines of 25.3%, the conversion to mono-amine being 14.6% and to di- and tri-amines 10.7%, but with a loss to butylene of 8%.

Example 2.—A catalyst prepared as described in Example 1 was employed in the synthesis of methyl amine from methanol and ammonia, at 340° C. with a molecular ratio of methanol to ammonia of 1.0 and a time of contact of gas and vapor with the catalyst of 3.5 seconds. The conversion of methanol to methyl amines was 31%, with only 6% conversion to dimethyl ether.

Example 3.—As illustrating the range of conditions over which a catalyst prepared in accordance with the principles of this invention may be employed, the supported alumina catalyst prepared as an Example 1 was employed for butyl amine synthesis at temperatures varying from 300° C. to 350° C., with ratios of ammonia to butanol varying from 2:1 to 7.5:1 and time of contacting of gas and vapor with the catalyst of about 2.5 seconds. The conversion of butanol to amines at the lower temperature was 20%, while losses due to butylene formation constituted only 0.6%. At the higher temperature the total amine formation was 46% with a butylene formation of 8%.

As illustrating the improved results to be obtained by the use of the catalyst of my invention, comparative tests were run under the conditions and amounts of material just stated, but using a catalyst consisting of aluminum phosphate instead of the impregnated, rigid gel catalyst of the invention. At 300° C., there was obtained a conversion to amines of only 12%, while the loss to butylene was 2%. At 350° C., the conversion to amines was 31%, but with a 28% loss to butylene.

*Example 4.*—A catalyst consisting of boric anhydride supported on silica gel was prepared by impregnating 60 grams of silica gel with 100 cc. of a 20% solution of ammonium borate in the manner described in Example 1. This catalyst when used for the synthesis of methyl amines from methanol and ammonia at a temperature of about 350° C. and a ratio of alcohol to ammonia of 1:2, and a time of contact of 3–5 seconds gave yields of amines of 15% and over.

*Example 5.*—Tri-butyl amine and ammonia in the molecular ratio of 1:6.5 were passed at 400° C. over the catalyst described in Example 1, the time of contact of gas with the catalyst being 2.6 seconds. Under these conditions, approximately 66% of the tri-butyl amine was converted to mono- and dibutyl amine with a conversion to butylene of only 3%.

While I have indicated the use of certain particular catalytic components for the impregnation of the porous, rigid gels, it is to be understood that my invention is not limited to their use. For instance, the finished impregnated gel may contain the oxides of such metals as tungsten and titanium, and even other oxides or mixtures of oxides which have the property of catalyzing dehydration reactions.

Furthermore, the preparation of the catalysts of the type herein described need not be limited to the particular method described above. For example, instead of previously evacuating the gel support, the gel may be soaked at atmospheric pressure, or at higher pressures, in a solution of suitable concentration of a salt of the metal selected as the catalytic component, followed by drying and ignition of the impregnated material to decompose the salt to a metal oxide. An alternative method may involve the use of a hydrous oxide, such as hydrous aluminum oxide, which may be precipitated on the gel support from a solution of its salt by means of a base such as ammonia.

Any salt, such as a nitrate or carbonate, which is capable of being decomposed by heat to the desired oxide, may be used for impregnation of the gel support.

The preferred concentration of the salt solutions used in impregnating the gel is about 20%. However, since the concentration of the solution is a relatively important factor in determining the amount of dehydrating oxide which is deposited on the gel, this may be varied between a 1% concentration and the concentration representing a saturated solution of the particular salt used.

Other porous rigid gel substances may be used in place of silica gel within the scope of the invention. For example, alumina gel or a zeolite may be used for this purpose. Furthermore, inert gel-like materials, gelatinous precipitated hydroxides or salts may also be employed.

The temperature limits between which the catalysts are operated may vary from 250° C. to 500° C., although the preferred range is from 300–350° C. The mol ratios of alcohol to ammonia may also vary from as low as 1:0.25 to as high as 1:10. It is also to be understood that other conditions, such as time of contact of the gas with the catalyst, may be varied widely within the scope of the invention.

It is further to be noted that the impregnated gel catalysts herein described may be used in reactions involving the use of pressures substantially above atmospheric.

The use of the catalysts prepared as described above may be applied to various hydration or dehydration reactions, such as the production of unsaturated hydrocarbons or ethers from alcohols, the hydrolysis of ethers, such as dimethyl ether, with steam, or in the elimination of water between acids and alcohols to form esters.

These porous catalytic materials are especially valuable in the synthesis of amines from alcohols and ammonia. The use of these catalysts is, however, not confined to the synthesis of aliphatic amines from aliphatic alcohols, but can also be applied to the synthesis of aromatic amines as well. Furthermore, a secondary or tertiary alcohol may be substituted for a normal alcohol, and an aliphatic or aromatic amine, such as aniline, may be substituted for ammonia. Catalysts of this type may also be used in the synthesis of mixed amines from mixtures of alcohols, such as methyl and butyl alcohols and ammonia.

It seems desirable at this point to discuss briefly the theory of the use of these catalytic materials, although such discussion is included merely for the purpose of more clearly describing the invention and is not intended to be in any sense a limitation thereof.

In the case of the synthesis of amines from aliphatic alcohols higher than methanol, two dehydration reactions are possible. One involves the elimination of water between the alcohol and the amine according to the equation—

(1) $nROH + NH_3 \rightarrow R_nNH_{(3-n)} + nH_2O$ which is the desired reaction and in which $n$ represents a whole number not greater than 3, and R represents an alkyl group. The other reaction, which is the undesired reaction, involves the elimination of water from the alcohol molecule itself, resulting in the formation of an unsaturated hydrocarbon according to the equation—

(2) $C_nH_{(2n+1)}OH \rightarrow C_nH_{(2n)} + H_2O$ in which $n$ represents a whole number.

The particular advantage of the use of the catalysts of my invention is the fact that they promote the reaction represented by Equation (1) with the substantial repression of the reaction represented by Equation (2).

Another advantage lies in the ease and cheapness with which a catalyst of the type described may be prepared as compared with such catalysts as basic aluminum sulphate or hydrated alumina which involve precipitation, long and tedious washing and difficult filtration. My improved catalysts also possess the advantage of high activity in practically all dehydration reactions.

As many apparently and widely different embodiments of this invention may be made without departing from the spirit and scope thereof, it is to be understood that I do not limit myself to the specific embodiments thereof except as defined in the appended claims.

I claim:

1. The process of producing a lower aliphatic amine which consists in passing a mixture of a vaporized lower aliphatic alcohol and ammonia over a catalyst comprising essentially a rigid, porous silica gel impregnated with aluminum oxide at a temperature of 250–500° C.

2. The process of producing a mixture of butyl amines, including mono-, di-, and tri-butyl amines, which consists in passing a mixture of vaporized butyl alcohol and ammonia at a temperature of 250–500° C. over a catalyst comprising essentially a rigid, porous silica gel impregnated with aluminum oxide.

3. The process of claim 2 in which the temperature is 300–400° C.

4. The process of producing a mixture of butyl amines which consists in passing a mixture of vaporized butyl alcohol and ammonia at a temperature of at least 300° C. over a catalyst prepared by evacuating silica gel at about 400° C. to remove absorbed and adsorbed gases and liquids, cooling the evacuated gel under vacuum, and thereafter impregnating said gel with aluminum nitrate, and igniting the impregnated material.

5. The process of producing lower aliphatic amines which comprises passing a mixture of a vaporized lower aliphatic alcohol and ammonia over a catalyst comprising essentially a rigid, porous gel impregnated with a dehydrating oxide, at a temperature of 250–500° C.

6. The process of producing lower aliphatic amines which comprises passing a mixture of a vaporized lower aliphatic alcohol and ammonia over a catalyst comprising essentially a rigid, porous silica gel impregnated with a dehydrating oxide, at a temperature of 250–500° C.

7. The process of producing a mixture of butyl amines, including mono-, di-, and tri-butyl amines, which consists in passing a mixture of vaporized butyl alcohol and ammonia at a temperature of 250–500° C. over a catalyst comprising essentially a rigid, porous gel impregnated with a dehydrating oxide.

8. The process of producing a mixture of butyl amines, including mono-, di-, and tri-butyl amines, which consists in passing a mixture of vaporized butyl alcohol and ammonia at a temperature of 300–400° C. over a catalyst comprising essentially a rigid, porous gel impregnated with a dehydrating oxide.

9. The process of producing a lower aliphatic amine which comprises passing a mixture of a vaporized lower aliphatic alcohol and ammonia at a temperature of 250–500° C. over a catalyst prepared by subjecting a rigid, porous gel to a vacuum to remove absorbed and adsorbed gases and liquids, and thereafter impregnating said gel with a solution containing a material yielding on ignition a catalytic dehydrating oxide and igniting the impregnated material.

10. The process of producing a lower aliphatic amine which comprises passing a mixture of a vaporized lower aliphatic alcohol and ammonia at a temperature of 250–500° C. over a catalyst prepared by subjecting a rigid, porous silica gel to a vacuum to remove absorbed and adsorbed gases and liquids, and thereafter impregnating said silica gel with a solution containing a material yielding on ignition a catalytic dehydrating oxide and igniting the impregnated material.

11. The process of producing a lower aliphatic amine which comprises passing a mixture of a vaporized lower aliphatic alcohol and ammonia at a temperature of 250–500° C. over a catalyst prepared by subjecting a rigid, porous gel to a vacuum to remove absorbed and adsorbed gases and liquids, and thereafter impregnating said gel with a solution containing an aluminum salt which will form an oxide upon ignition and igniting the impregnated material.

12. The process of producing a lower aliphatic amine which comprises passing a mixture of a vaporized lower aliphatic alcohol and ammonia at a temperature of 250–500° C. over a catalyst prepared by subjecting a rigid, porous silica gel to a vacuum to remove absorbed and adsorbed gases and liquids, and thereafter impregnating said silica gel with a solution containing an aluminum salt which will form an oxide upon ignition and igniting the impregnated material.

13. The process of producing an amine which consists in passing a mixture of a vaporized lower aliphatic alcohol and a member of the group consisting of ammonia and aniline over a catalyst comprising essentially a rigid, porous gel impregnated with a dehydrating oxide, at a temperature of 250–500° C.

14. The process of producing an amine which consists in passing a mixture of a vaporized lower aliphatic alcohol and a member of the group consisting of ammonia and aniline over a catalyst comprising essentially a rigid, porous silica gel impregnated with a dehydrating oxide, at a temperature of 250–500° C.

15. The process of producing lower aliphatic amines which comprises passing a mixture of a vaporized lower aliphatic alcohol and ammonia over a catalyst at a temperature of 250–500° C., said catalyst comprising essentially a rigid, porous gel impregnated with a mixture of dehydrating oxides.

HERRICK R. ARNOLD.